United States Patent [19]

Miyadera

[11] Patent Number: 5,550,587
[45] Date of Patent: Aug. 27, 1996

[54] WHITE BALANCE ADJUSTMENT DEVICE FOR A STILL-VIDEO CAMERA HAVING AN ELECTRONIC FLASH

[75] Inventor: Shunichi Miyadera, Itabashi-ku, Japan

[73] Assignee: Asahi Kogaku Kogyo Kabushiki Kaisha, Tokyo, Japan

[21] Appl. No.: 430,854

[22] Filed: Apr. 28, 1995

[30] Foreign Application Priority Data

May 2, 1994 [JP] Japan .................................. 6-115961

[51] Int. Cl.⁶ ............................. H04N 9/73; H04N 5/225
[52] U.S. Cl. .......................... 348/223; 348/224; 354/413; 354/430
[58] Field of Search ..................... 354/430, 413, 354/145.1, 126; 348/223, 224, 230, 655, 225, 227; H04N 9/73, 5/225, 5/232, 9/04

[56] References Cited

U.S. PATENT DOCUMENTS

| | | | |
|---|---|---|---|
| 4,847,680 | 7/1989 | Okino | 348/224 |
| 5,001,552 | 3/1991 | Okino | 348/224 |
| 5,087,936 | 2/1992 | Ogata et al. | 354/430 |
| 5,132,825 | 7/1992 | Miyadera | 348/224 |
| 5,283,632 | 2/1994 | Suzuki et al. | 348/223 |

FOREIGN PATENT DOCUMENTS

| | | |
|---|---|---|
| 63-80691 | 4/1988 | Japan . |
| 63-115486 | 5/1988 | Japan . |

*Primary Examiner*—Safet Metjahic
*Assistant Examiner*—Glenton B. Burgess
*Attorney, Agent, or Firm*—Greenblum & Bernstein P.L.C.

[57] ABSTRACT

A white balance adjusting device has a white balance sensor for sensing a color temperature and an image-object distance sensing mechanism. The image-object distance sensing mechanism senses the image-object distance using a CCD by which the object image is sensed. The image frame is sub-divided into a plurality of sectors, and the image-object distance is sensed for each sensor. The white balance adjustment is performed by changing coefficients corresponding to the color temperature of the ambient daylight and the flash of light. For a sector in which the image-object distance is short, since the effect of the electronic flash is large, the coefficient corresponding to the color temperature of the flash of light is set to a high value. For a sector in which the image-object distance is long, since the effect of the electronic flash is small, the coefficient of the color temperature of the flash of light is set to a low value.

9 Claims, 8 Drawing Sheets

Fig. 3

| | | | | | |
|---|---|---|---|---|---|
| Mg | G | Mg | G | Mg | - - - |
| Ye | Cy | Ye | Cy | Ye | - - - |
| G | Mg | G | Mg | G | - - - |
| Ye | Cy | Ye | Cy | Ye | - - - |
| Mg | G | Mg | G | Mg | - - - |

WHITE BALANCE ADJUSTMENT DEVICE FOR A STILL-VIDEO CAMERA HAVING AN ELECTRONIC FLASH

BACKGROUND OF THE INVENTION

1. Field of the Invention

The present invention relates to a white balance adjusting device provided in a still-video camera having an electronic flash.

2. Description of the Related Art

Conventionally, in a recording operation of a still-video camera, a white balance adjustment is performed so that an image of a white object recorded on a recording medium is reproduced as a white image, regardless of a color temperature of the light radiated onto the object in the photographing operation.

A still-video camera having an electronic flash is constructed in such a manner that the white balance adjustment is performed based on a color temperature of the light radiated from the electronic flash, when the electronic flash is used. For example, when a xenon electronic flash lamp is provided in the radiating unit of the electronic flash device, the white balance adjustment is performed so that blue is reduced and red is intensified, thus preventing the white object from being reproduced as a blue-tinged object due to the light radiated from the xenon electronic flash lamp.

In such a white balance adjustment, however, when the color temperature of the ambient daylight is different from that of the electronic flash light in a photographing operation in which the electronic flash is used, the photographed image may be reproduced in an unnatural color. Namely, since the flash of light reaches only a predetermined portion of an object located at a distance, a photographed image portion corresponding to a short distance has a color temperature of the flash of light and a photographed image portion corresponding to a long distance has a color temperature of the ambient daylight. Therefore, if the white balance adjustment is performed based on the color temperature of the flash of light, although the photographed image portion corresponding to the short distance is reproduced in the proper color, the photographed image portion corresponding to the long distance may not be reproduced in the proper color. Similarly, if the white balance adjustment is performed based on the color temperature of the ambient daylight, although the photographed image portion corresponding to the long distance is reproduced in the proper color, the photographed image portion corresponding to the short distance may not be reproduced in the proper color.

SUMMARY OF THE INVENTION

Therefore, an object of the present invention is to provide a white balance adjusting device by which the photographed image can be reproduced in the proper color.

According to the present invention, there is provided a white balance adjusting device comprising color temperature sensing device, image-object distance sensing device and a white balance adjusting circuit. The white balance adjusting device is provided in a still-video camera in which an imaging device outputs an image signal corresponding to an object, and an electronic flash radiates a flash of light to the object.

The color temperature sensing device senses a first color temperature of the flash of light and a second color temperature of light reflected from the object prior to radiating the electronic flash. The image-object distance sensing device senses an image-object distance from the object to an image formed by a photographing optical system, and senses the image-object distance for each sector which is formed by sub-dividing a frame photographed by the still-video camera. The white balance adjusting circuit performs a white balance adjustment to the image signal outputted from the imaging device based on the first color temperature and the second color temperature. The white balance adjusting circuit performs the white balance adjustment for each sector in accordance with the image-object distance of each sector prior to radiating the electronic flash.

Further, according to the present invention, there is provided a still-video camera comprising an imaging device, an electronic flash, color temperature sensing device, an image-object distance sensing device and a white balance adjusting circuit.

The imaging device outputs an image signal corresponding to an object. The electronic flash radiates a flash of light to the object. The color temperature sensing means senses a first color temperature of the flash of light and a second color temperature of light reflected from the object prior to radiating the electronic flash. The image-object distance sensing means senses an image-object distance from the object to an image formed by a photographing optical system. The image-object distance sensing device senses the image-object distance for each sector which is formed by sub-dividing a frame photographed by the still-video camera. The white balance adjusting circuit performs a white balance adjustment to the image signal outputted from the imaging device based on the first color temperature and the second color temperature. The white balance adjusting circuit performs the white balance adjustment for each sector in accordance with the image-object distance of each sector prior to radiating the electronic flash.

BRIEF DESCRIPTION OF THE DRAWINGS

The present invention will be better understood from the description of the preferred embodiments of the invention set forth below, together with the accompanying drawings, in which:

FIG. 3 is a diagram showing an arrangement of a CCD used with the present invention:

DESCRIPTION OF THE PREFERRED EMBODIMENTS

Figure 1:
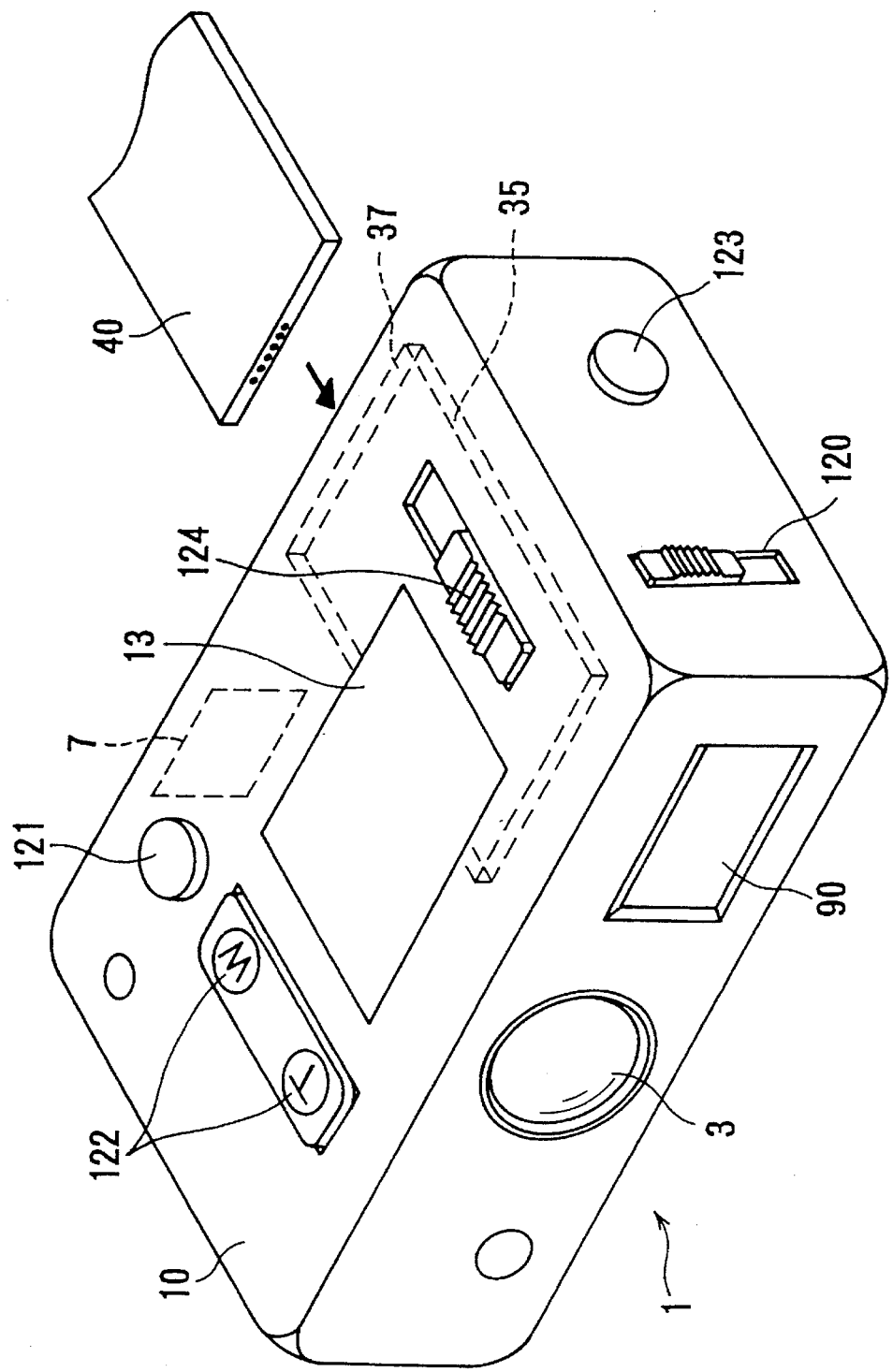
FIG. 1 is a perspective view showing a still-video camera in which a white balance adjusting device of an embodiment of the present invention is provided.

The present invention will now be described with reference to embodiments shown in the drawings.

FIG. 1 is a perspective view showing a still-video camera 1 in which a white balance adjusting device is provided. The still-video camera 1 has a box-type camera body 10. A front surface of the camera body 10 is provided with a photographing lenses 3 and a radiation unit 90 of an electronic flash 9 (shown in FIG. 2). A back surface of the camera body 10 is provided with a view-finder 7 and a mounting slot 37 in which an IC memory card 40 is mounted. An upper surface of the camera body 10 is provided with a release switch 121, a zoom switch 122 an eject switch 124 and an indicating unit 13. A side surface of the camera body 10 is provided with a main switch 120 and a flash switch 123.

Figure 2:
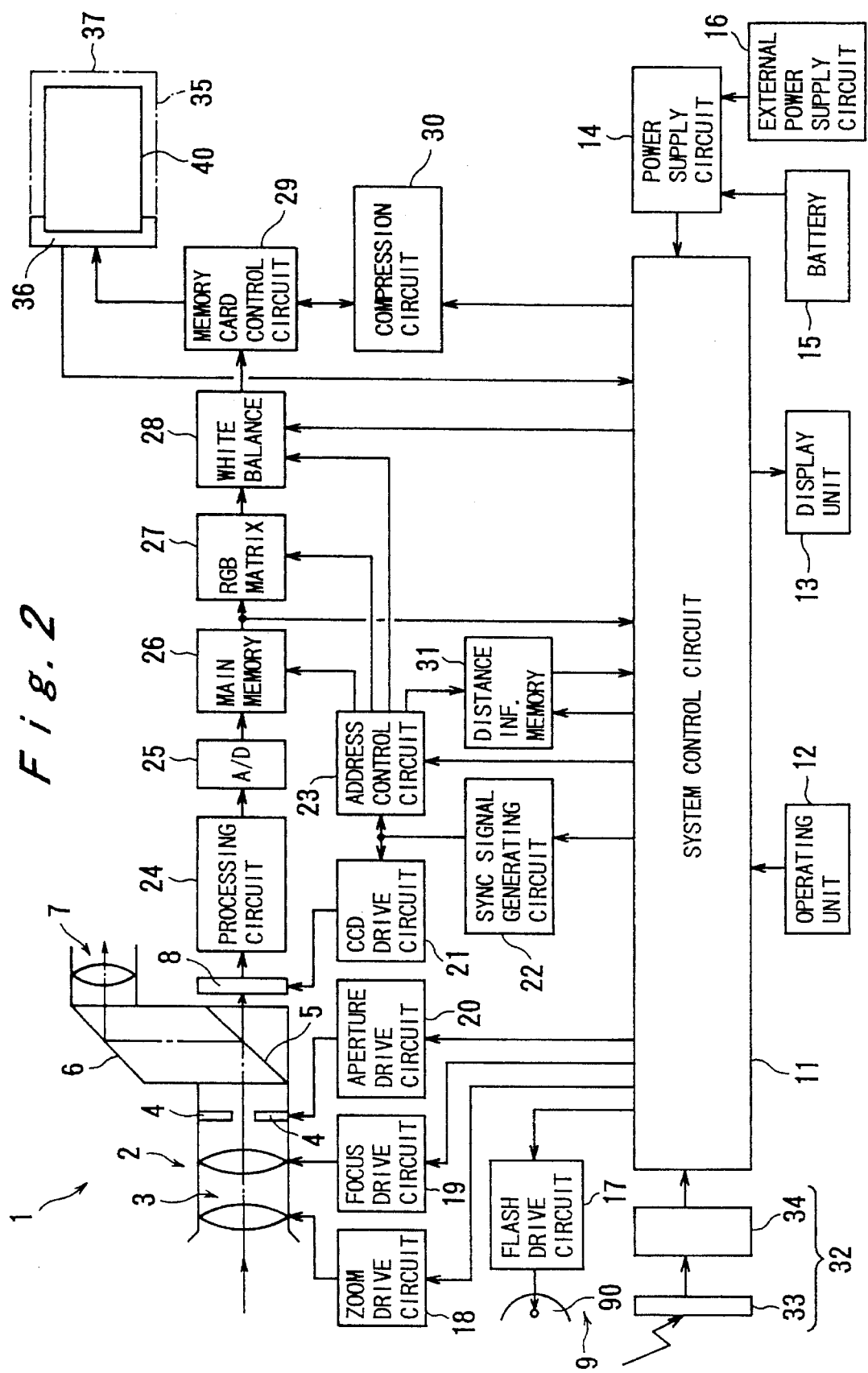
FIG. 2 is a block diagram showing the still-video camera of FIG. 1.

FIG. 2 is a block diagram showing the still-video camera 1. This still-video camera 1 is provided with a system control circuit 11 which has a micro-computer to perform a white balance adjustment, a sequence control for photographing and recording, an exposure calculation, an automatic exposing operation, an auto-focus operations an electronic flash controls and other operations for the still-video camera.

A photographing optical system 2 comprises the photographing lenses 3, an aperture 4 and a half mirror 5. The photographing lenses 3 and the aperture 4 are mounted in a cam cylinder, and the half mirror is provided behind the cam cylinder.

The photographing lenses 3 are mounted in the cam cylinder and can be displaced in a forward and a rearward direction along the optical axis thereof by a rotation of the cam cylinder. A zooming operation of the photographing lenses 3 is controlled by a zoom drive circuit 18 which has a zooming drive motor (not shown) and is operated by the zoom switch 122. A focusing operation of the photographing lenses 3 is controlled by a focus drive circuit 19 which has a focusing drive motor (not shown) and is operated by partly depressing the release switch 121. A command signal for the focusing operation is outputted from the system control circuit 11 in accordance with a photographing distances as described later.

A aperture 4 has a plurality of blades, and the opening diameter of the aperture 4 is changed by a rotation or displacement of the blades. Aperture 4 is controlled by an aperture drive circuit 20 having an aperture drive motor (not shown). Aperture 4 can also operate as a shutter. Command signals for an aperture value and an electronic shutter speed (i.e. an electric charge accumulating time in the CCD 8) are outputted frown the system control circuit 11, in which an exposure calculation is carried out based on luminance data obtained by a photometry unit (not shown). Namely, in accordance with the command signals, blades of the aperture 4 are driven and closed with a mechanical shutter speed.

Light from an object passes through the photographing lenses 3 and the aperture 4 and reaches the half mirror 5. A part of the light is reflected by the half mirror 5 and led to a view-finder optical system having a reflecting mirror 6 and a view-finder 7. The remaining part of the light passes through the half mirror 5 and is led to a CCD (charge coupled device) 8 disposed behind the photographing optical system 2. Thus, the object image is formed on the light receiving surface of the CCD 8.

The CCD 8 is provided in a plane in which an image can be focused or formed by the photographing system 2. The CCD 8 has a plurality of photodiodes disposed in a matrix arrangement. The CCD 8 is driven by a CCD drive circuit 21 in accordance with a syncronizing signal outputted from a synchronizing signal generating circuit 22, which is controlled by the system control circuit 11 and operated by fully depressing the release switch 121. Namely, when the release switch 121 is fully depressed, the CCD 8 is exposed with a proper shutter speed obtained in accordance with the luminance data as described above, and thus, in each photodiodes electric charges are accumulated, the amount of which corresponds to the light received by the photodiode. The accumulated electric charges are outputted from the CCD 8 and inputted into a CCD signal processing circuit 24.

A color filter is disposed on the light receiving surface of the CCD 8. The color filter comprises a complementary color filter with a checkerboard arrangement in which groups of green (G), magenta (Mg), yellow (Ye) and cyan (Cy) elements are arranged. One each of these filter elements is disposed on each of the photodiodes of the CCD 8. As shown in FIG. 3, four photodiodes covered by four filter elements (i.e., one each of greens magenta, yellow or cyan on each photodiode) form one unit which corresponds to one pixel included in an image frames and any one photodiode is included in four units, except those photodiodes located on each edge.

One image frame has pixels of (m lines)×(n rows) (480 lines×768 rows in this embodiment). In the following descriptions a pixel positioned at the mth line and the nth row is indicated by (m,n).

For example, as shown in FIG. 3, a pixel of the image frame (1,1) is formed by pixels A1, A2, B1 and B2 of the CCD 8; a pixel of the image frame (1,2) is formed by pixels A2, A3, B2 and B3 of the CCD 8; and, a pixel of the image frame (2,1) is formed by pixels B1, B2, C1 and C2 of the CCD 8.

The signals outputted from the CCD 8 are inputted into a CCD signal processing circuit 24, in which the signals are subjected to a predetermined process so that magenta, yellow, cyan and green analog image signals of the photographed object image are obtained. The analog signals are inputted into an A/D converter 25, and thus, complementary color digital signals of magenta, yellow and cyan, and a primary color digital signal of green are obtained, and are stored in a main memory 26.

An address of the main memory 26, in which each of the digital signals is written, is controlled by an address control circuit 23, which operates a writing address counter provided therein based on a synchronizing signal outputted by the synchronizing signal generating circuit 22. When the signal stored in the main memory 26 is read out, the address control circuit 23 operates a read address counter provided therein based on a clock signal outputted from the system control circuit 11, so that an address of the main memory 26 in which each of the signals is stored, is controlled.

The signals read from the main memory 26 are inputted into an RGB-matrix circuit 27. In the RGB-matrix circuit 27, the magenta, yellow, cyan and green signals are subjected to a predetermined process to be converted into red (R), green (G) and blue (B) digital image signals, i.e., primary digital signals, in accordance with a clock signal outputted from the address control circuit 23.

Each of the primary color signals is inputted into a white balance adjustment circuit 28, so that a white balance adjustment is performed, in accordance with a clock signal outputted from the address control circuit 23. In this embodiment, as described later, the amount of gain of the R-digital image signal and the amount of gain of the B-digital image signal are independently set in the white balance adjustment circuit 28, so that a white balance of the digital image signal is adjusted.

Each of the primary color digital image signals outputted from the white balance adjustment circuit 28 are inputted into a memory card control circuit 29, in which the primary color digital image signals are compressed by a predetermined amount by an image signal compression circuit 30 controlled by the system control circuit 11. The compressed image signals are outputted from the memory card control circuit 29 and transmitted to a mounting unit 35 in which an TC memory card 40 is mounted. Then, the compressed image signals are stored at a predetermined address of an TC memory provided in the IC memory card 40 through a connector 36 of the mounting unit 35.

The IC memory card 40 comprises a recording medium in which an image photographed by the still-video camera 1 is recorded. The IC memory of the TC memory card 40 has a recording area for storing the image signal and a recording area for storing card attributes. The card attributes include the kind of TC memory (static RAM, or flash memory, for example), the storage capacity of the TC memory, the access speed, etc. The TC memory may store information regarding exposure conditions such as shutter speed, aperture value, a combination of the shutter speed and the aperture value, and photographing conditions such as the photographing date.

The IC memory card 40 is handled by the operator of the still-video camera to be mounted in the mounting unit 35. Namely, the IC memory card 40 is inserted in the mounting unit 35 in such a manner that the end portion of the TC memory card 40 contacts the innermost portion of the mounting unit 35, and is pressed so that a terminal of the IC memory card is connected to a terminal of the connector 36. The mount unit 35 is provided with a card ejecting mechanism (not shown). This card ejecting mechanism is operated in accordance with the eject switch 124, enabling the IC memory card 40 to be ejected from the mount unit 35.

An operating unit 12 and a display unit 13 are connected to the system control circuit 11. The operating unit 12 has the main switch (electric power switch) 120, the release switch 121, the zoom switch 122, the flash switch 123 and the eject switch 124. When the flash switch 123 is turned ON, a flash photography mode, in which photography is carried out using the electronic flash 9, is set. Further, the operating unit 12 may be provided with a record mode selecting switch for selecting either a the field record mode or the frame record mode, and a designating switch for designating the recording area on the IC memory of the IC memory card 40 on which a image signal is to be recorded.

When a flash switch 123 is turned ON, a command signal for setting the flash photography mode is inputted into the system control circuit 11 so that the flash photography mode is set. Conversely, when the flash switch 123 is turned OFF, a usual photography mode, in which photography is carried out without operating the electronic flash 9, is set.

The display unit 13 comprises a liquid crystal display or a light-emitting diode to indicate, for example; whether the main switch 120, the flash switch 123, etc. are turned ON or OFF; that the field record mode or the frame record mode has been selected by the record mode selecting switch; the photographing date; whether or not the TC memory card 40 is mounted; the recording area of the IC memory card 40 in which an image signal is to be stored; information relating to flash photography; the zooming magnification; the current time; etc.

An electric power supply circuit 14 is connected to the system control circuit 11 to supply electric power. The electric power supply circuit 14 is connected to a battery 15, and has a terminal for connecting to an electric power supply circuit 16 provided externally of the still-video camera 1.

In the flash photography mode, the electronic flash 9 is operated by a flash drive circuit 17 when a flash command signal is inputted into the flash drive circuit 17 from the system control circuit 11, and thus, the radiation unit 90, such as a xenon lamp, is radiated. The amount of light (i.e., the radiating time) is controlled by a light amount adjusting circuit provided in the flash drive circuit 17.

A white balance sensor 32 is provided for sensing a color temperature of light. The white balance sensor 32 comprises a light receiving unit 33 and a colorimetry circuit 34. In the white balance sensor 32 ambient daylight is sensed. Namely, intensities of a red (R) component, a green (G) component and a blue (B) component of ambient daylight reflected from the object when the radiation unit 90 of the electronic flash 9 is not radiated are sensed. Then, an R/G signal corresponding to the intensity ratio of the F-component and the G-component, and a B/G signal corresponding to the intensity ratio of the B-component and the G-component are obtained by the colorimetry circuit 34. These R/G and B/G signals are inputted into the system control circuit 11, and are used for the white balance adjustment. In a photographing operation when the electronic flash is used, the gain for the F-component is increased and the gain for the B-component is decreased, as compared to a photographing operation carried out without using the electronic flash.

A distance information memory 31 is provided for storing spatial frequencies corresponding to sectors which are formed by sub-dividing an image frame photographed by the still-video camera 1, and a distance from the still-video camera 1 to the photographed object.

In the synchronizing signal generating circuit 22, a clock signal is generated based on a control signal inputted from the system control circuit 11, and is inputted into the address control circuit 23. Further, in the synchronizing signal generating circuit 22, a horizontal synchronizing signal and a vertical synchronizing signal are generated based on the clock signal and are inputted into the CCD drive circuit 21.

A white balance adjustment in a photographing (or recording operation) is described below.

When a photographing operation is carried out in the flash photography mode, i.e., when a photographing operation is carried out with radiating a flash of light by the radiation unit 90 of the electronic flash 9, the white balance adjustment is performed based on a first color temperature and a second color temperature. The first color temperature is the color temperature of the flash of light. The second color temperature is the color temperature of light reflected from the object when the electronic flash 9 is not used. This reflected light is defined as ambient daylight in this specification.

The white balance adjustment is performed in accordance with a distance from the still-video camera to the object as described below.

Figure 4:
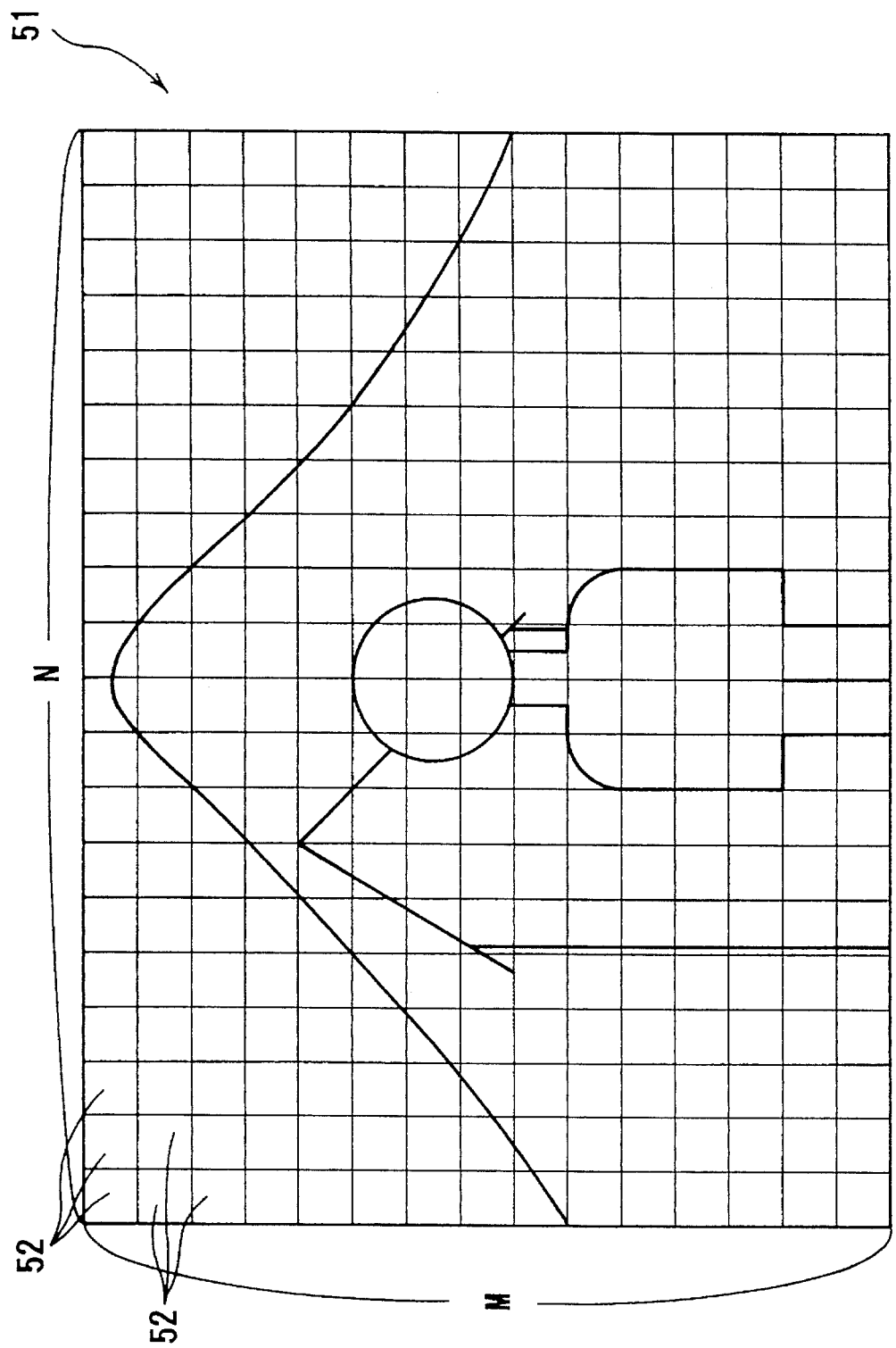
FIG. 4 is a view showing an example of an image frame.
Figure 5:
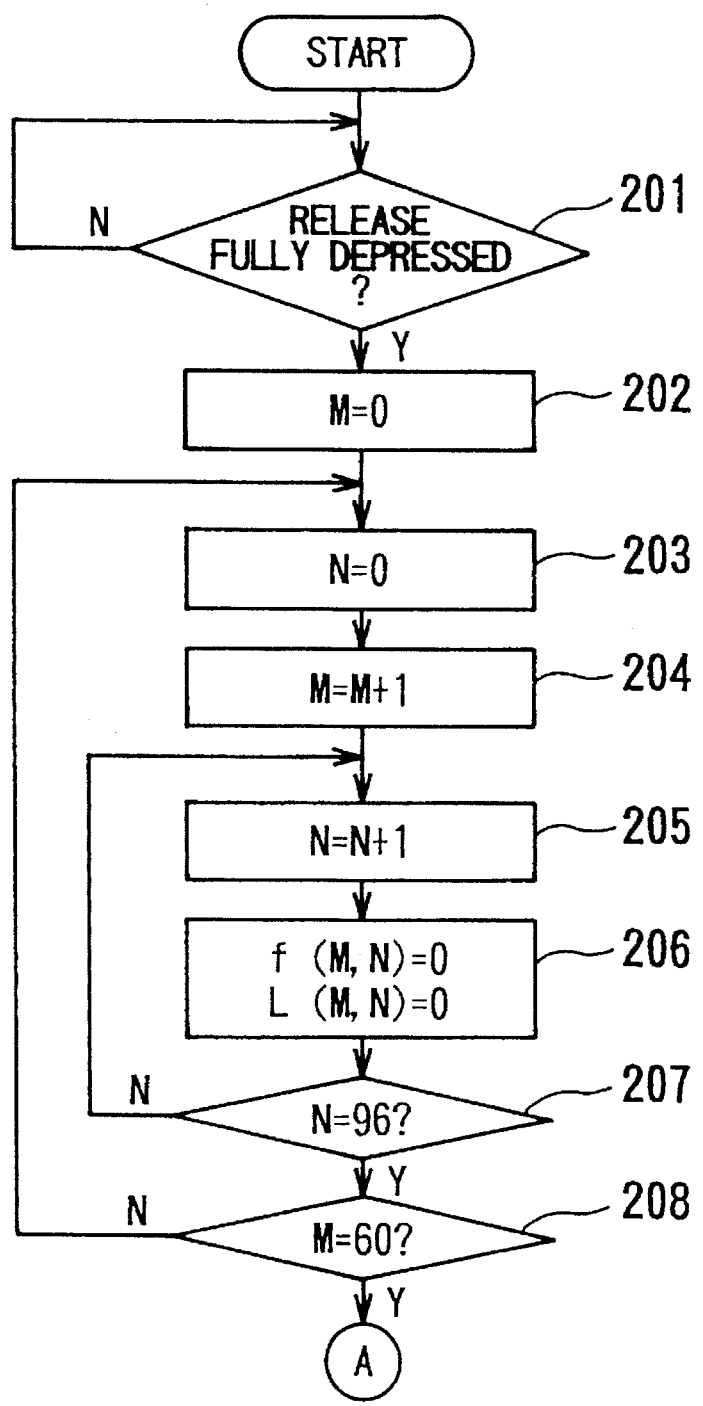
FIG. 5 is a first part of a flow chart of a program by which a white balance adjustment is performed.
Figure 6:
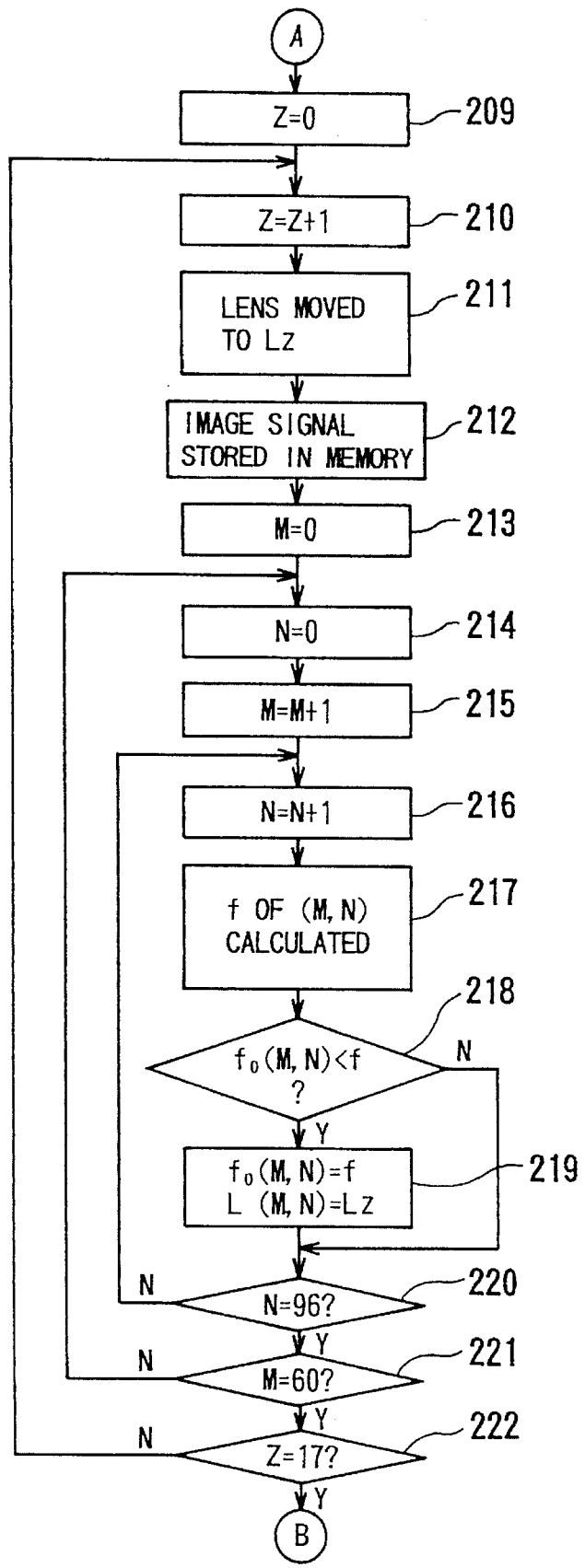
FIG. 6 is a second part of the flow chart of the program by which the white balance adjustment is performed.
Figure 7:
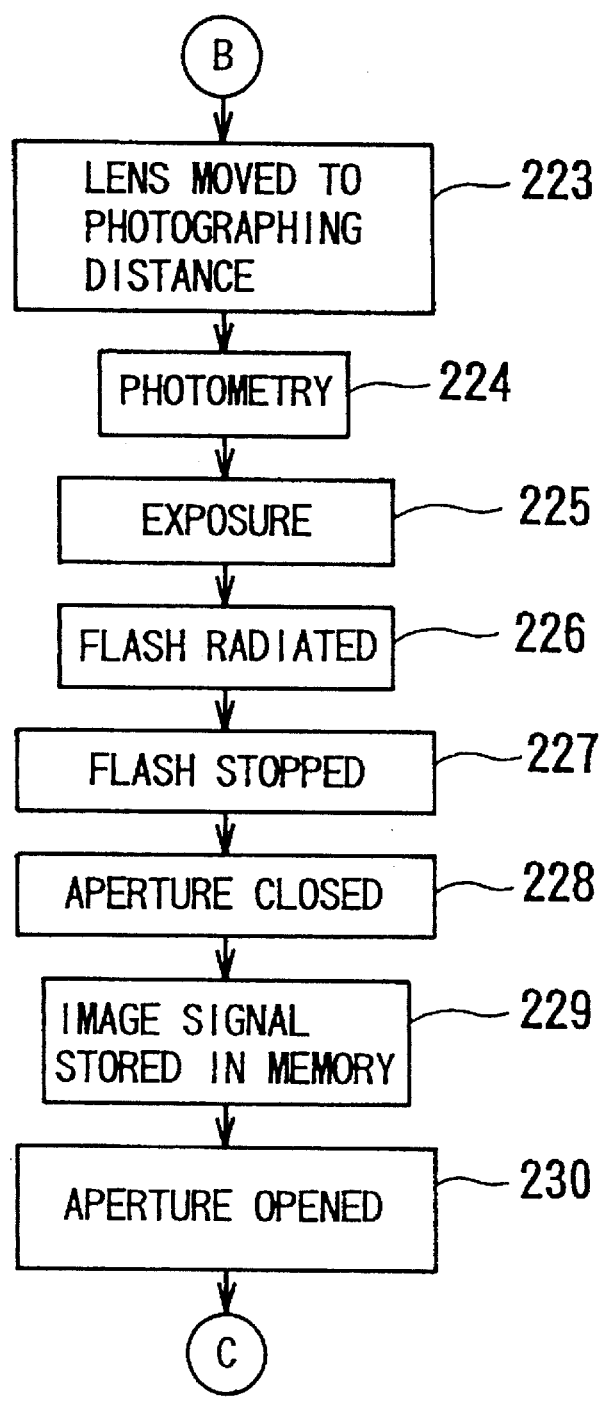
FIG. 7 is a third part of the flow chart of the program by which the white balance adjustment is performed.

FIG. 4 shows a photographed image frame. As shown in this drawing, the photographed image frame 51 is subdivided into a plurality of sectors 52. Namely, the frame 51 is divided by a plurality of horizontal lines extending in a horizontal direction and a plurality of vertical lines extending in a vertical direction to form the sectors 52, thus a mesh of (M lines)×(N rows)(60 lines×96 rows in this embodiment) are formed. Note that, in the drawing, for simplification, only 15×20 sectors are shown.

The sector 52 corresponding to the Mth line and the Nth row is indicated by (M,N). Each sector 52 corresponds to 64 photodiodes of the CCD 8, which are arranged in a matrix of 8 lines×8 rows. In the flash photography mode, the distance from each of the sectors 52 to the object (i.e. the image-object distance) is detected by an image-object distance sensing mechanism having the photographing optical system 2, the CCD 8, the system control circuit 11, the focus drive circuit 19, the CCD drive circuit 21 and the address control circuit 23.

The image-object distance of each of the sectors 52 is sensed by the image-object distance sensing mechanism 5 processing the image signal outputted from the CCD 8 as described below.

As shown in Table 1, the amount of forward movement of the photographing lenses 3 in the optical axis direction is divided, for examples into 17 steps, in the case when the photographing lenses 3 is suitable for forming an image of the image-object distance 0.65 m through to infinity on the light receiving surface of the CCD 8.

In Table 1, the reference "Z" indicates the steps counted from the position at which the amount of forward displacement of the photographing lenses 3 is the largest, reference "Lz" indicates the image-object distance of the photographing lenses 3 corresponding to each step "Z" and reference "Xn" indicates the amount of forward displacement of the photographing lenses 3 at each "Lz" when the amount of forward displacement of the photographing lenses 3 is supposed to be 0 at Lz =∞.

TABLE 1

|  | Z | Lz (m) | Xn (mm) |
|---|---|---|---|
| LONG | 17 | ∞ | 0 |
| DISTANCE | 16 | 8.012 | 0.019 |
|  | 15 | 4.492 | 0.034 |
|  | 14 | 3.127 | 0.049 |
|  | 13 | 2.402 | 0.064 |
|  | 12 | 1.952 | 0.079 |
| INTERMEDIATE | 11 | 1.646 | 0.094 |
| DISTANCE | 10 | 1.424 | 0.109 |
|  | 9 | 1.255 | 0.124 |
|  | 8 | 1.123 | 0.139 |
|  | 7 | 1.017 | 0.154 |
| SHORT | 6 | 0.930 | 0.169 |
| DISTANCE | 5 | 0.856 | 0.184 |
|  | 4 | 0.794 | 0.199 |
|  | 3 | 0.741 | 0.214 |
|  | 2 | 0.694 | 0.229 |
|  | 1 | 0.653 | 0.244 |

As shown in Table 1, steps 1–6 are defined as a short distance, steps 7–11 are defined as an intermediate distance, and steps 12–17 are defined as a long distance.

First, in Z=1, the spatial frequency of each sector 52 is obtained based on the image signal therefrom. Then, the photographing lenses 3 are driven by the focus drive circuit 19 to move along the optical axis, and where Z=2–17, the spatial frequency of each sector 52 is obtained based on the image signal therefrom. Regarding each of the sectors 52, the image-object distance Lz corresponding to the step Z which has the highest spatial frequency among steps 1–17 is stored in the distance information memory 31.

Then, regarding each sector 52, based on information of the long distance, the intermediate distance and the short distance, an amplification factor of the color temperature of the flash of light and an amplification factor of the color temperature of the ambient daylight are changed, so that the amounts of gain of the R-signal and the B-signal in the white balance circuit 28 are determined. Note that the three data, i.e., the short distance, the intermediate distance and the long distance, are hereinafter referred to as "coefficient information" hereinafter.

It is supposed that, when the white balance adjustment is performed based on only the color temperature of the flash of light (R/G signal and B/G signal of the flash of light), the amplification factors for the R-signal and the B-signal in the white balance adjustment circuit 28 are set to AR1 and AB1, respectively. Further, it is supposed that, when the white balance adjustment is performed based on only the color temperature of the ambient daylight R/G signal and B/G signal of the ambient daylight), the amplification factors for the R-signal and the B-signal in the white balance adjustment circuit 28 are set to AR2 and AB2, respectively. The white balance adjustment is performed by setting coefficients which modify the amplification factors (with one value set for each R/G and B/G signal, respectively) in such a manner that the coefficient values vary based on the coefficient information.

In the short distance, since the influence of the flash of light to the object is strong, the white balance adjustment is performed in a way that the coefficient of the color temperature of the flash of light (i.e., the coefficient of AR1 and AB1) is set to a high value. For example, if the ratio of the coefficient of AR1 and AB1 and the coefficient of AR2 and AB2 is 8:2, the gains of the R-signal and the B-signal in the white balance adjustment circuit 28 are (AR1×0.8+AR2×0.2) and (AB1×0.8+AB2×0.2), respectively.

In the long distance, since the influence of the flash of light to the object is weak, the white balance adjustment is performed in a way that the coefficient of the color temperature of the ambient daylight (i.e., the coefficient of AR2 and AB2) is set to a high value. For exampled if the ratio of the coefficient of AR1 and AB1 and the coefficient of AR2 and AB2 is 2:8, the gains of the R-signal and the B-signal in the white balance adjustment circuit 28 are (AR1×0.2+AR2×0.8) and (AB1×0.2+AB2×0.8), respectively.

In the intermediate distance, the influence of the flash of light to the object is intermediate between that of the short distance and the long distance. Namely, the white balance adjustment is performed in a way that the coefficient of the color temperature of the flash of light (i.e., the coefficient of AR1 and AB1) and the coefficient of the color temperature of the ambient daylight (i.e., the coefficient of AR2 and AB2) are set to an equal value. For example, the gains of the R-signal and the B-signal in the white balance adjustment circuit 28 are (AR1×0.5+AR2×0.5) and (AB1×0.5+AB2×0.5), respectively.

Of the data shown in Table 1, AR1 and AB1 are stored in a non-volatile memory provided in the system control circuit 11, before the photographing operation. Conversely, AR2 and AB2 are obtained by the system control circuit 11 based on the R/G signal and the B/G signal outputted from the white balance sensor 32, at every photographing operation.

For a photographing operation to be carried out and a photographed image to be stored in the IC memory card 40; first, the main switch 120 of the operating unit 12 is turned ON; then, the IC memory card 40 is mounted in the mount unit 35 to electrically connect the terminal of the IC memory card 40 to the terminal of the connector 36. Thus, the card attribute information previously stored in the IC memory card 40 is stored in the non-volatile memory provided in the system control circuit 11 through the terminals, the connector 36 and the memory card control circuit 29.

Then, electric power is supplied from the electric power supply circuit 14 to the IC memory card 40. The card attribute information stored in the non-volatile memory is read therefrom, and the operation mode of each of the devices in the still-video camera is set based on the read information. The ON/OFF condition of the flash switch 123 is selected, so that the flash photography mode or the usual photography mode is set. Thus, the still-video camera is set to a state in which a photographing operation can be performed, and thus, if the release switch 121 is fully depressed, a photographing operation will be carried out.

An operation of the system control circuit 31 in the flash photography mode is described below with reference to the flow charts shown in FIGS. 5 through 8.

It is assumed that the main switch 120 and the flash switch 123 are turned ON. In Step 201, it is determined whether the release switch 121 is fully depressed. When it is determined that the release switch 121 is fully depressed, in Step 202, the line number M of the sector is set to 0, and then in Step 203, the row number N of the sector is set to 0. In Step 204, the line number M is increased by one, and in Step 205, the row number N is increased by one. In Step 206, the spatial frequency f(M,N)=0 and the distance L(M,N)=0 are written in predetermined addresses, corresponding to M and N, in the distance information memory 31.

It is determined in Step 207 whether N=96 is satisfied. When it is determined that N=96 is not satisfied, the process returns to Step 205 so that Steps 205 through 207 are executed again.

When it is determined in Step 207 that N=96 is satisfied, it is determined in Step 208 whether M=60 is satisfied. When it is determined that M=60 is not satisfied, the process returns to Step 203 so that Steps 203 through 208 are again executed. Thus, the distance information memory 31 is reset to store new data.

When it is determined in Step 208 that M=60 is satisfied, Z=0 is set in Step 209, and Z is increased by one in Step 210.

Then, in Step 211, the photographing lenses 3 are driven by the focus drive circuit 19, and thus, the photographing lenses 3 are moved Xn (mm) corresponding to step Z so that the image-object distance of the photographing lenses 3 is set to Lz.

In Step 212, the signal outputted from the CCD 8 is subjected to a predetermined process, and A–D converted, and thus, the digital image signal corresponding to one frame is stored in the main memory 26.

In Step 213, M is set to 0, and then in Step 214, N is set to 0. In Step 215, M is increased by ones and in Step 216, N is increased by one.

In Step 217, a digital image signal corresponding to (M,N) is read out from a predetermined address of the main memory 26, and a spatial frequency f at (M,N) is calculated. In Step 218, the spatial frequency f at (M,N) in the current Z is compared with the spatial frequency $f_0$ (M,N) which has the maximum value up to now, so that it is determined whether the spatial frequency $f_0$ (M,N) is less than f. Namely, it is determined whether the spatial frequency corresponding to the current Z is higher than that corresponding to the previous step Z.

When it is determined in Step 218 that the spatial frequency $f_0$ (M,N) is lower than f, the spatial frequency $f_0$ (M,N) and the image-object distance L(M,N) stored in the distance information memory 31 are replaced with f and Lz. Namely, in Step 219, $f_0$ (M,N) is set equal to f and the image-object distance L(M,N) is set equal to Lz, and they are stored in predetermined addresses of the distance information memory 31. Then, in Step 220, it is determined whether N=96 is satisfied.

Conversely, when it is determined in Step 218 that the spatial frequency $f_0$ (M,N) is greater than or equal to f, the spatial frequency $f_0$ (M,N) and the image-object distance L(M,N) stored in the distance information memory 31 are maintained, and in Step 220, it is determined whether N=96 is satisfied.

When it is determined in Step 220 that N=96 is not satisfied, the process returns to Step 216 so that Steps 216 through 220 are executed again. When it is determined in Step 220 that N=96 is satisfied, it is determined in Step 221 whether M=60 is satisfied. When it is determined in Step 221 that M=60 is not satisfied, the process returns to Step 214 so that Steps 214 through 221 are executed again.

When it is determined in Step 221 that M=60 is satisfied, it is determined in Step 222 whether Z=17 is satisfied. When it is determined in Step 222 that Z=17 is not satisfied, the process returns to Step 210 so that Steps 210 through 222 are executed again.

Thus, for each of the sectors 52, the image-object distance Lz of the photographing lenses 3, in which the spatial frequency has the maximum value from among steps 1–17, is stored in the distance information memory 31 as the image-object distance of the corresponding sector 52.

In Step 222, it is determined whether Z=17. If not, Steps 210 through 222 are repeated. If so, the process goes to Step 223, where, based on the distance information stored in a predetermined address of the distance information memory 31, the photographing lenses 3 are moved to a position at which the image-object distance of the photographing lenses 3 is equal to an object distance from the object to the light receiving surface of the CCD 8, by the focus drive circuit 19. Thus, the in-focus condition is obtained. Note that the object distance may be obtained from any predetermined sector 52, for example a sector located at the center portion of the image. Thus, in Step 223, the photographing lenses 3 are moved by an amount of projection Xn corresponding to the distance Lz which corresponds to the object distance.

Then, in Step 224, the color temperature of the ambient daylight is sensed by the white balance sensor 32 in a state in which a flash of light is not radiated by the electronic flash 9. Namely, the R/G signal and the B/G signal with respect to the ambient daylight are obtained by the white balance sensor 32, and inputted into the system control circuit 11.

The amplification factors of the R-signal and the B-signal in the white balance adjustment circuit 28 are obtained for each of the sectors 52, based on: the R/G signal and the B/G signal of the flash of light; the R/G signal and the B/G signal of the ambient daylight; and, the coefficient information of the short distance, the intermediate distance and the long distance. Namely, in the short distances the coefficients of the color temperature of the ambient daylight are set to a smaller value than that of the flash of light. Likewise, in the intermediate distance, the coefficients of the color temperature of the ambient daylight are set to the same value as that of the flash of light, and in the long distance, the coefficients of the color temperature of the ambient daylight are set to a larger value than that of the flash of light. Then, regarding the short distances the intermediate distance and the long distance, the amplification factors of the R-signal and the B-signal in the white balance adjustment circuit 28 are obtained, respectively.

In Step 225, after the residual electric charges accumulated on the photodiodes of the CCD 8 are discharged, an exposure of the CCD 8, i.e., accumulation of electric charge, is started.

In Step 226, a radiation of the radiation unit 90 of the electronic flash 9 is started. Then, when a predetermined time has passed from the start of the radiations in Step 227, the radiation is stopped, and in Step 228, the aperture 4 is closed.

Then, the signal is read out from the CCD 8, and is subjected to a predetermined process in the CCD signal processing circuit 24, so that analog image signals of magenta, yellow, cyan and green are obtained. The analog image signals are converted to digital image signals by the A–D converter 25, and in Step 229, the digital image signals are temporarily stored in the main memory 26 to record the digital image signals in the IC memory card 40 at a predetermined writing speed.

After the digital image signals are stored in the main memory 26, in Step 230, the aperture 4 is opened.

Then, in Step 231, the pixel line number m is set to 0, and in Step 232, the pixel row number n is set to 0. In Step 233, the pixel line number m is increased by one, and in Step 234, the line number M to which the pixel line number m belongs is obtained by formula (1) below. Note that, in formulas (1) and (2), "INT" is a function by which an interger is obtained from an argument by omitting the digits after the decimal point, and "INT" is used in this embodiment for recognizing which sector the pixel belongs to:

$$M=1+INT((m-1)/8) \qquad (1)$$

In Step 235, the pixel row number n is increased by one, and in Step 236, the row number N to which the pixel row number n belongs is obtained by formula (2):

$$N=1+INT((n-1)/8) \qquad (2)$$

Then, in Step 237, digital image signals of magenta, yellow, green and cyan are read out from the main memory 26, and are transformed to primary color digital image signals of red (R), green (G) and blue (B) by the RGB matrix circuit 27. In Step 238, the image-object distance L (M,N) of the sector (M,N) to which the pixel (m,n) belongs is read from the distance information memory 31, and it is determined to which, from among the short distance, the intermediate distance and the long distance, the image-object distance L (M,N) corresponds.

Figure 8:
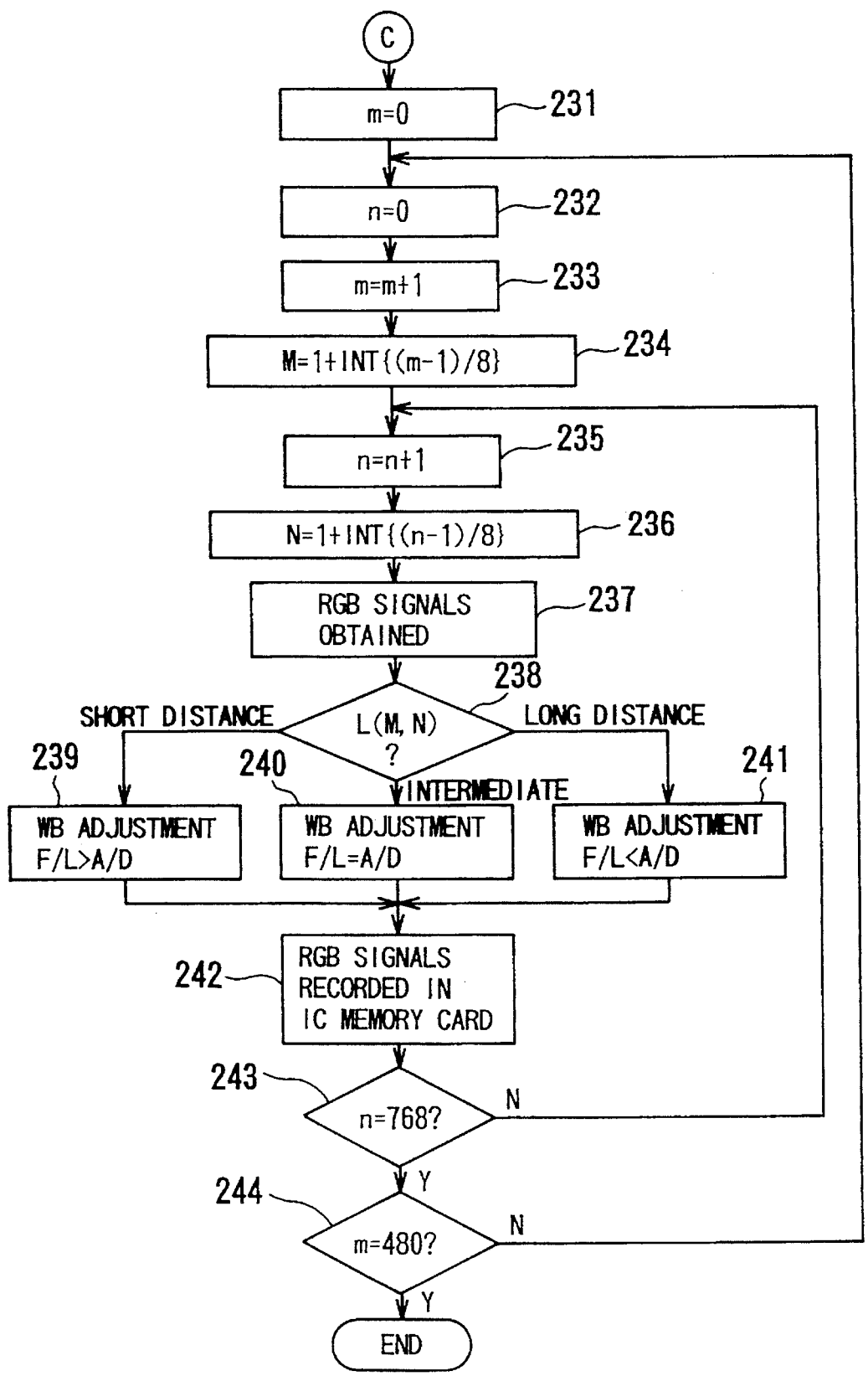
FIG. 8 is a fourth part of the flow chart of the program by which the white balance adjustment is performed.

When it is determined in Step 238 that the image-object distance L (M,N) corresponds to the short distance, in Step 239, the white balance adjustment is performed under the condition in which the coefficient of the color temperature of the flash of light (F/L in FIG. 8) is larger than that of the ambient daylight (A/D in FIG. 8). Namely, as described above, the amplification factors of the R-signal and the B-signal in the white balance adjustment circuit 28 are modified by the coefficient to be the ampification factors for the short distance, and thus, the gain of the R-signal and the gain of the B-signal of the pixel (m,n) are adjusted in the white balance adjustment circuit 28.

When it is determined in Step 238 that the image-object distance L (M,N) corresponds to the intermediate distance, in Step 240, the white balance adjustment is performed under the condition in which the coefficient of the color temperature of the flash of light is equal to that of the ambient daylight. Namely, as described above, the amplification factors of the R-signal and the B-signal in the white balance adjustment circuit 28 are modified by the coefficient to be the ampification factors for the intermediate distances and thus, the gain of the R-signal and the gain of the B-signal of the pixel (m,n) are adjusted in the white balance adjustment circuit 28.

When it is determined in Step 238 that the image-object distance L (M,N) corresponds to the long distance, in Step 241, the white balance adjustment is performed under the condition in which the coefficient of the color temperature of the flash of light is smaller than that of the ambient daylight. Namely, as described above, the amplification factors of the R-signal and the B-signal in the white balance adjustment circuit 28 are modified by the coefficient to be the ampification factors for the long distances and thus, the gain of the R-signal and the gain of the B-signal of the pixel (m,n) are adjusted in the white balance adjustment circuit 28.

After Step 239, 240 or 241 is executed, the process goes to Step 242, in which the R-, G- and B-signal to which the white balance adjustment has been performed are recorded in the IC memory of the IC memory card 40.

Then, it is determined in Step 243 whether n=768 is satisfied. When it is determined that n=768 is not satisfied, the process returns to Step 235 so that Steps 235 through 243 are executed again. Conversely, when it is determined in Step 243 that n=768 is satisfied, it is determined in Step 244 whether m=480 is satisfied. When it is determined that m=480 is not satisfied, the process returns to Step 232 so that Steps 232 through 244 are executed again.

When it is determined in Step 243 that m=480 is satisfied, this program ends.

Thus, the recording operation in which the image signal obtained by the flash photography mode is recorded in the IC memory card 40 is completed.

Note that, in the usual photography mode, the white balance adjustment is performed based on the color temperature of the ambient daylight. The image-object distance is sensed using predetermined sectors 52, and the in-focus state is obtained based on the distance data of the sectors 52.

As described above, in the still-video camera of this embodiment, since the white balance adjustment is performed in accordance with the image-object distance in the flash photography mode, the white balance adjustment is properly performed, so that the color of the photographed image is properly reproduced and the photographed image is recorded in a recording medium. Namely, a natural color which is like one seen by the human eye is reproduced. Further, in comparison with a state in which the flash photography mode is carried out by attaching a filter onto the radation unit of the electronic flash, the amount of light flashed is not reduced.

In the still-video cameras the image frame is divided into a plurality of sectors, so that the image-object distance is sensed at each sectors and the white balance adjustment is performed. Therefore, even if there is a sector in which the image-object distance thereof is different from the other sectors in the image frame, the white balance adjustment is performed properly for the whole image frame, and thus, the proper color reproduction of the photographed image is obtained fop the whole the image.

Further, in the still-video camera, the color temperature of the ambient daylight is sensed whenever a photographing operation is carried out, and the white balance is performed based on the result of sensing the color temperature. Therefore, in a plurality of photographing conditions under which the color temperatures of the ambient daylight are different, such as outdoors, indoors, etc, the white balance adjustment is properly performed.

Although the image-object distance is classified into a short distance, an intermediate distance and a long distance in the above embodiment, the image-object distance can be classified into two steps, or more than three steps in the present invention. The white balance adjustment is performed more accurately as the image-object distance is more finely sub-divided. However, if the number of image-object distance steps is too many, the white balance adjustment becomes complicated. Therefore, the number of steps optimumly may be three through five.

Although the image frame is sub-divided into 60 lines×96 rows in the above embodiment, the number of divided sectors and the pattern thereof is not restricted to the embodiment. Further, a distance measuring mechanism in which a distance measurement is performed for a plurality of points on the image frame can be used. In this case, the number of sub-divided sectors should correspond to the number of measured points.

The color filter is not restricted to the complementary color filter with a checkerboard arrangement. For example, a dual-type color filter having a G-filter and an R/B-filter, or a triple-type color filter having R-, G- and B-filters, can be used.

The recording medium is not restricted to an IC memory card, but may be a memory housed in the still-video camera, a magnetic recording medium, a magneto-optical recording medium or an optical recording medium.

Although the embodiment of the present invention have been described herein with reference to the accompanying drawings, obviously many modifications and changes may be made by those skilled in this art without departing from the scope of the invention.

The present disclosure relates to subject matter contained in Japanese Patent Application No. 6-115961 (filed on May 2, 1994) which is expressly incorporated herein, by reference, in its entirety.

What is claimed is:

1. A white balance adjusting device provided in a still-video camera, said white balance adjusting device having an imaging device outputting an image signal corresponding to an object to be photographed, and an electronic flash radiating a flash of light to said object, said white balance adjusting device comprising:

color temperature sensing means for sensing a first color temperature corresponding to said flash of light radiated by said electronic flash and a second color temperature corresponding to light reflected from said object prior to said object being radiated by said electronic flash;

image-object distance sensing means for sensing an image-object distance from said object to an image formed by a photographing optical system of said still-video camera, said image-object distance sensing means sensing said image-object distance for each sector which is formed by sub-dividing a frame photographed by said still-video camera; and a white balance adjusting circuit for performing a white balance adjustment of said image signal outputted from said imaging device based on said first color temperature and said second color temperature, said white balance adjusting circuit performing said white balance adjustment for each sector in accordance with said image-object distance for each sector when said electronic flash is used.

2. A white balance adjusting device according to claim 1, wherein said image-object distance sensing means senses said image-object distance for each sector by processing said image signal outputted from said imaging device.

3. A white balance adjusting device according to claim 2, wherein said image-object distance sensing means senses said image-object distance by obtaining a spatial frequency of said image signal of each sector.

4. A white balance adjusting device according to claim 1, wherein said frame is sub-divided by a plurality of horizontal lines extending in a horizontal direction and a plurality of vertical lines extending in a vertical direction to form said sectors.

5. A white balance adjusting device according to claim 1, wherein said white balance adjusting circuit performs said white balance adjustment to said image signal by controlling a coefficient corresponding to each of said first and second color temperatures, so that for a shorter said image-object distance, a larger said coefficient corresponding to said first color temperature is made relative to said coefficient corresponding to said second color temperature.

6. A white balance adjusting device according to claim 5, wherein each image-object distance is classified as a short distance, an intermediate distance or a long distance, said coefficient corresponding to said first color temperature being larger than said coefficient corresponding to said second color temperature for said short distance, said coefficient corresponding to said first color temperature being substantially equal to said coefficient corresponding to said second color temperature for said intermediate distance, and said coefficient corresponding to said first color temperature being smaller than said coefficient corresponding to said second color temperature for said long distance.

7. A white balance adjusting device provided in a still-video camera in which an imaging device outputs an image signal corresponding to an object to be photographed, and an electronic flash radiates a flash of light to said object, said white balance adjusting device comprising:

image-object distance sensing means for sensing an image-object distance from said still-video camera to said object, said image-object distance sensing means sensing said image-object distance for sector which is of a plurality of sectors formed by sub-dividing a frame photographed by said still-video camera; and a white balance adjusting circuit for performing a white balance adjustment of said image signal outputted from said imaging device based on a color temperature corresponding to said flash of light and a color temperature corresponding to light reflected from said object prior to said electronic flash radiating a flash of light, said white balance adjusting circuit performing said white balance adjustment for each of said plurality of sectors in accordance with said image-object distance of each of said plurality of sectors when said electronic flash is used.

8. A white balance adjusting device provided in a still-video camera in which an imaging device outputs an image signal corresponding to an object to be photographed, and an electronic flash radiates a flash of light to said object, said white balance adjusting device comprising:

means for sensing a first color temperature corresponding to said flash of light and a second color temperature corresponding to light reflected from said object prior to said object being radiated by said electronic flash;

means for sensing an image-object distance from said still-video camera to said object, said image-object distance sensing means sensing said image-object distance for a plurality of sectors formed by sub-dividing a frame photographed by said still-video camera; and means for performing a white balance adjustment of said image signal outputted from said imaging device based on said first color temperature and said second color temperature, said white balance adjustment performing means performing said white balance adjustment for each of said plurality of sectors in accordance with said image-object distance for each of said plurality of sectors when said electronic flash is used.

9. A still-video camera, comprising:

an imaging device that outputs an image signal corresponding to an object to be photographed;

an electronic flash that radiates a flash of light to said object;

color temperature sensing means for sensing a first color temperature corresponding to said flash of light and a second color temperature corresponding to light reflected from said object prior to said object being radiated by said electronic flash;

image-object distance sensing means for sensing an image-object distance from said still-video camera to said object, said image-object distance sensing means sensing said image-object distance for a plurality of sectors formed by sub-dividing a frame photographed by said still-video camera; and a white balance adjusting circuit for performing a white balance adjustment of said image signal outputted from said imaging device based on said first color temperature and said second color temperature, said white balance adjusting circuit performing said white balance adjustment for each of said plurality of sectors in accordance with said image-object distance for each of said plurality of sectors when said electronic flash is used.

* * * * *